May 10, 1927.
C. M. PORTER
1,627,998
TRACTOR DRAWBAR COUPLING
Filed Sept. 18, 1925
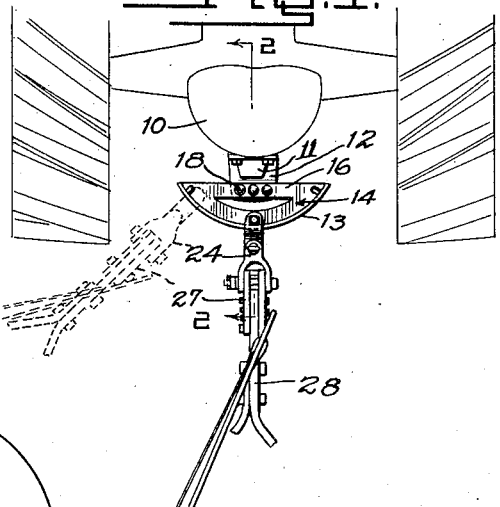
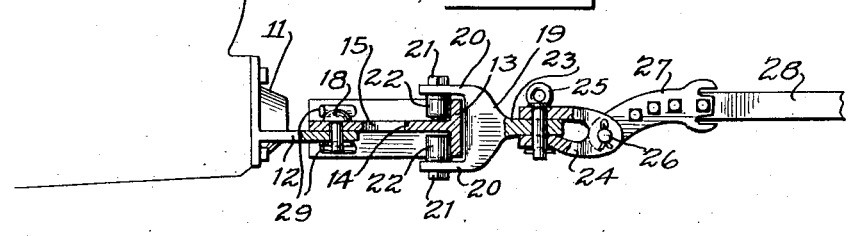
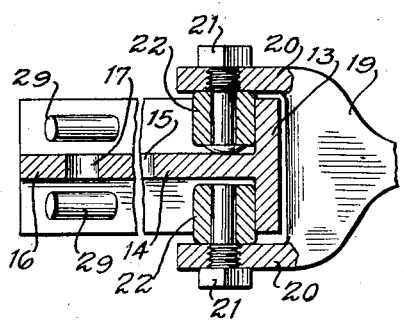
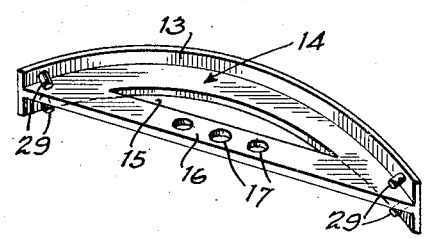
Inventor
Cloyd M. Porter
By Lancaster and Allwine
Attorneys Patented May 10, 1927.

1,627,998

UNITED STATES PATENT OFFICE.

CLOYD M. PORTER, OF CONNERSVILLE, INDIANA.

TRACTOR DRAWBAR COUPLING.

Application filed September 18, 1925. Serial No. 57,188.

The present invention relates to tractors, and more particularly to an improved hitch or coupling for use between a tractor and a drawbar.

An object of the present invention is to provide an improved coupling adapted to automatically maintain the drawbar in the true line of draft when the tractor is turning in either direction, and to automatically bring the drawbar back into the line of draft when the tractor assumes a straight line position.

Another object of the invention is to provide a sector for attachment to the drawbar cap or lug at the rear end of a tractor and to mount upon the sector a travelling member to which the drawbar is connected so that the travelling member may traverse the sector in opposite directions from an intermediate position to permit the drawbar to swing into various angles at the rear end of the tractor and to thus divert or offset the line of draft to accord with the angular position between the draft bar and the tractor.

The invention further aims at the provision of a coupling of this character which is provided with anti-friction devices so that the coupling may quickly and automatically assume the correct position in either direction as the tractor turns, and without imposing a side draft on the engine or tractor frame which results in the skidding of the front wheels of the tractor and consequently the loss of control of the steering mechanism.

The invention still further aims to provide a tractor coupling of this character to which the usual drawbar and clevis may be connected so that no alterations are required either in the drawbar cap, the clevis or the drawbar.

A still further object of the invention is to provide an attachment comprising two parts which may be economically manufactured and easily applied to tractors without the exercise of any great amount of skill.

The above and various other objects and advantages of this invention will in part be described in and in part be understood from the following detailed description of the present preferred embodiment, the same being illustrated in the accompanying drawing, wherein:

Fig. 1 is a top plan view of a coupling constructed according to the present invention and as applied to a drawbar and the rear end of a tractor.

Fig. 2 is an enlarged longitudinal section taken through the same substantially on the line 2—2 of Fig. 1.

Fig. 3 is a longitudinal section taken through the sector and travelling member in position thereon, and Fig. 4 is a detail perspective view of the sector.

Referring to the drawing 10 designates the rear end portion of a tractor which is provided in the usual manner with a drawbar cap 11 having a rearwardly extending lug or lip 12 suitably apertured for the reception of a coupling pin or the like in usual practice.

In the present instance a sector 13 is provided and comprises an arcuate or circular double flange extending substantially one third of a circle in length and reinforced at its inner side by an intermediate horizontal web 14 which may have an opening 15 therein to reduce the weight of the sector and provide a cross bar 16 extending between the ends of the flange 13. The cross bar 16 is provided with a number of openings 17 adapted to receive pins 18 which also extend through the openings in the cap lug 12 for the purpose of rigidly securing the sector across the lug 12. The flange of the sector 13 thus extends in a general vertical direction across the rear end of the tractor and is curved uniformly in opposite directions from the central longitudinal line of the tractor.

Mounted upon the sector 13 is a travelling block 19 in the form of a yoke having upper and lower arms 20 which extend across the upper and lower edges of the curved flange of the sector, and which have inwardly extending bearing pins 21 upon which are mounted rollers 22, the rollers lying at opposite sides of the web 14 and engaging the inner sides of the curved flange. The rollers 20 are adapted to traverse the inner side of the curved flange and to take up the pull of the drawbar.

The travelling block 19 is provided with a rearwardly extending apertured lug 23 which is adapted to be embraced at opposite sides by a clevis 24 detachably secured to the lug 23 by a coupling pin 25. The clevis 24 is pivotally connected by a pin 26 to the head 27 of a drawbar 28.

For the purpose of maintaining the block 19 upon the sector, the latter is provided at opposite ends with a pair of stop pins 29 which are carried by the curved flange and project inwardly from the upper and lower portions thereof to engage the rollers 22 and prevent the same from rolling off of the opposite ends of the sector.

In operation, when the tractor is moving forwardly in a straight line as shown in full lines in Fig. 1, the travelling block 19 assumes a central position intermediately of the sector 13. When, however, the tractor turns out of a straight line the drawbar assumes an angular position with respect to the length of the tractor and draft upon the drawbar tends to swing the forward end of the tractor outwardly toward a straight line position. The improved coupling relieves the tractor of such strain as the travelling block 19 freely moves in either direction and to the necessary extent to follow the drawbar and transmit the pull through the corresponding portions of the sector 13 in direct radial alignment with the rear portion 10 of the tractor.

The use of the sector 13 thus imposes any lateral draft through the drawbar directly to the rear traction wheels and the wheels maintain the rear end of the tractor from slipping sidewise and there is no tendency for the front end of the tractor to be swung out of its curved path. The application of the improved coupling therefore prevents such costly accidents as throwing the forward end of the tractor against a fence, or into a ditch, and the direction of travel of the tractor with the machine coupled thereto is more easily determined and maintained during ploughing and other work imposing more or less lateral pulling on the drawbar.

It is of course understood that various changes and modifications may be made in the details of construction and design of the above specifically described embodiment of this invention without departing from the spirit thereof, such changes and modifications being restricted only by the scope of the following claims.

What is claimed is:

1. A drawbar coupling comprising a segmental T section, a supporting web within the segmental section for keeping the T section rigid and adapted for attachment to a tractor, a yoke slidably mounted on the segmental section, and stop means secured to said segmental section for determining the travel of the yoke.

2. A drawbar coupling comprising a segmental T section, a supporting web connecting the opposite inner ends of the segment whereby to prevent bending of the segmental section, a yoke extending over the upper and lower edges of the segment, rollers mounted on the yoke and adapted to engage the inner surface of the segment, and stop means on the segment for determining the travel of the rollers.

3. A drawbar coupling comprising a sector having a supporting web connecting the opposite inner ends thereof and a double flange at its outer edge, a yoke loosely engaging the opposite edges of the flange, a pair of rollers mounted on the yoke at the inner end thereof and adapted to engage the inner side of the flange, and a plurality of stop pins secured to the flange at opposite ends thereof for determining the travel of the rollers.

CLOYD M. PORTER.